UNITED STATES PATENT OFFICE.

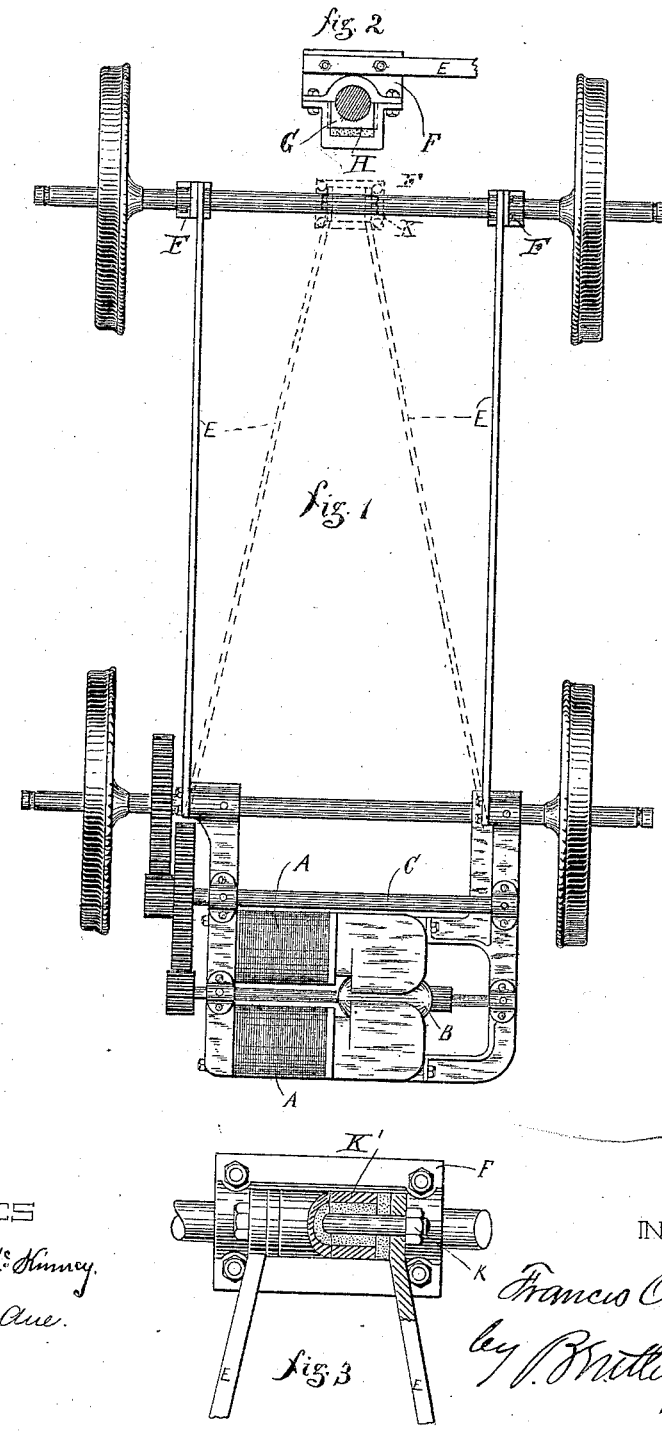

FRANCIS O. BLACKWELL, OF NEW YORK, N. Y., ASSIGNOR TO THE THOMSON-HOUSTON ELECTRIC COMPANY, OF CONNECTICUT.

ELECTRIC-MOTOR TRUCK.

SPECIFICATION forming part of Letters Patent No. 449,197, dated March 31, 1891.

Application filed August 31, 1889. Serial No. 322,635. (No model.)

*To all whom it may concern:*

Be it known that I, FRANCIS O. BLACKWELL, a citizen of the United States, residing at New York, in the county of New York, State of New York, have invented certain new and useful Improvements in Electric-Motor Trucks, of which the following is a specification.

My invention relates to electric-railway vehicles; and it consists in certain features of construction of the propelling-motor and the method of attachment to the vehicle.

Referring to the accompanying drawings, Figure 1 is a plan of a railway-truck embodying my invention. Fig. 2 is a detail, and Fig. 3 is a modification.

Referring to the drawings, A are two magnetic bobbins, having their axes parallel with the driven axle. B is an armature, having its axis also parallel with the axle and inclosed by the pole-pieces in the ordinary manner. The yoke of the magnet and the pole-pieces are provided with extensions having bearings upon the axle. These extensions carry a counter-shaft C, geared with the armature and with the axle. Counterbalancing bars E extend to the opposite axle, and are there provided with a bearing. (Shown in detail in Fig. 2.)

In Fig. 2, F is a casing forming a journal-box bolted to bar E. G is a brass or similar bearing resting on cushion H, of rubber. This gives a slight spring movement to the motor at starting, and also relieves the structure of strain and wear. Instead of having each of the bars E provided with a bearing, I prefer to bring them together, as shown in Fig. 3, and there make a common bearing for the two.

In Fig. 3 the box F is extended and the two bars E are attached to it by means of bolt K, having a large rubber washer K', allowing it to yield in every direction.

By the construction which I have described the car-body will be entirely relieved of any strain from the working of the motor, the free end of the motor being upheld by a bearing on the axle, independent of the springs supporting the car-body. There will, moreover, be ample room vertically for placing a motor of this construction under a vehicle, and its commutator will be readily accessible. In case, also, that the motor is overhung, as shown in the drawings, an additional weight will be imposed upon the driven axle, and a consequent increase in tractive force will result.

What I claim as new, and desire to secure by Letters Patent, is—

1. The combination, with a driven axle, of a motor having a bearing thereon, and a single supplementary supporting-bearing on the opposite axle.

2. The combination, with a driven axle, of a motor journaled thereon, having its field-magnet and armature both parallel to the axle, and a support for the free end of the motor attached directly to the opposite axle.

3. The combination, with a driven axle, of a motor having its field-magnet and its armature both parallel with the axle and provided with a bearing thereon and a journal-box on the opposite axle supporting the free end of the motor.

4. The combination, with a driven axle, of a motor having two bearings thereon and geared thereto, with a single bearing upon the opposite axle supporting the free end of the motor.

5. The combination, with a driven axle, of a motor having its field-magnet parallel with the axle and geared thereto, bearings for the said motor upon the axle, and a support for its free end, provided with a spring or elastic bearing resting directly upon the opposite axle.

6. The combination, with a driven axle of a car-truck, of an electric motor outside the axle journaled thereon and a single supplementary supporting-bearing on the opposite axle, as set forth.

7. The combination, in an electric-motor truck, of a motor having the axis of its field-magnets and its armature parallel with the axle and provided with extensions from its yoke, and pole-pieces journaled on the axle, with means for supporting the motor in position, as described.

This specification signed and witnessed this 20th day of August, 1889.

FRANCIS O. BLACKWELL.

Witnesses:
GEORGE BAUMANN,
JOHN REVELL.